United States Patent
Ootsuka (10) Patent No.: US 11,420,300 B2
(45) Date of Patent: Aug. 23, 2022

(54) COMPONENT FITTING STRUCTURE AND AUTOMATIC ASSEMBLY SYSTEM HAVING DISENGAGEMENT PREVENTION FUNCTION

(71) Applicant: FANUC CORPORATION, Yamanashi (JP)

(72) Inventor: Yuuma Ootsuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 70 days.

(21) Appl. No.: 16/815,009

(22) Filed: Mar. 11, 2020

(65) Prior Publication Data

US 2020/0298353 A1    Sep. 24, 2020

(30) Foreign Application Priority Data

Mar. 22, 2019  (JP) .............................. JP2019-055574

(51) Int. Cl.
  *B23P 19/04*  (2006.01)
  *B25J 11/00*  (2006.01)
  *F16B 21/08*  (2006.01)
  *F16B 5/06*  (2006.01)

(52) U.S. Cl.
  CPC ............. *B23P 19/04* (2013.01); *B25J 11/005* (2013.01); *F16B 5/065* (2013.01); *F16B 5/0657* (2013.01); *F16B 21/088* (2013.01); *F16B 5/0664* (2013.01)

(58) Field of Classification Search
  CPC ...... F16B 5/065; F16B 5/0657; F16B 5/0664; F16B 21/088
  See application file for complete search history.

(56) References Cited

U.S. PATENT DOCUMENTS

| 2012/0321379 | A1* | 12/2012 | Wang | F16B 5/0642 |
| | | | | 403/321 |
| 2014/0298638 | A1* | 10/2014 | Colombo | F16B 17/00 |
| | | | | 29/525.01 |
| 2016/0236592 | A1* | 8/2016 | Peniche | B60N 2/0725 |
| 2018/0180076 | A1* | 6/2018 | Betancourt Santana | ..................... F16B 5/0664 |
| 2018/0209457 | A1* | 7/2018 | Snoeyink | B60R 13/04 |
| 2019/0072120 | A1* | 3/2019 | Santillan Gutierrez | ..................... F16B 5/065 |

FOREIGN PATENT DOCUMENTS

| JP | H1176987 U | 12/1989 |
| JP | H88554 A | 1/1996 |
| JP | H9-280219 A | 10/1997 |
| JP | 2004249378 A | 9/2004 |

(Continued)

*Primary Examiner* — Daniel J Wiley
(74) *Attorney, Agent, or Firm* — Hauptman Ham, LLP (57) ABSTRACT

A component fitting structure includes: a first component including an elastic column provided with an engaging piece; and a second component including a cutout capable of being engaged by the engaging piece, in which the engaging piece includes a first protrusion protruding laterally from the elastic column and a second protrusion protruding in a direction opposite to a protrusion direction of the first protrusion, and the cutout includes a first edge configured to oppose the first protrusion and a second edge configured to oppose a part of the second protrusion and open a remainder of the second protrusion, after the first component and the second component are assembled.

7 Claims, 7 Drawing Sheets

(56) References Cited

FOREIGN PATENT DOCUMENTS

| | | | |
|---|---|---|---|
| JP | 2009-180323 | A | 8/2009 |
| JP | 2016-180489 | A | 10/2016 |
| JP | 2016192493 | A | 11/2016 |
| JP | 2017173701 | A | 9/2017 |

* cited by examiner

RELATED ART

FIG. 7B

RELATED ART

FIG. 7C

RELATED ART

COMPONENT FITTING STRUCTURE AND AUTOMATIC ASSEMBLY SYSTEM HAVING DISENGAGEMENT PREVENTION FUNCTION

RELATED APPLICATIONS

The present application claims priority to Japanese Application Number 2019-055574, filed Mar. 22, 2019, the disclosure of which is hereby incorporated by reference herein in its entirety.

BACKGROUND OF THE INVENTION

1. Field of the Invention

The present invention relates to component fitting technology, and particularly relates to a component fitting structure and an automatic assembly system having a disengagement prevention function.

2. Description of the Related Art

Figure 7A:
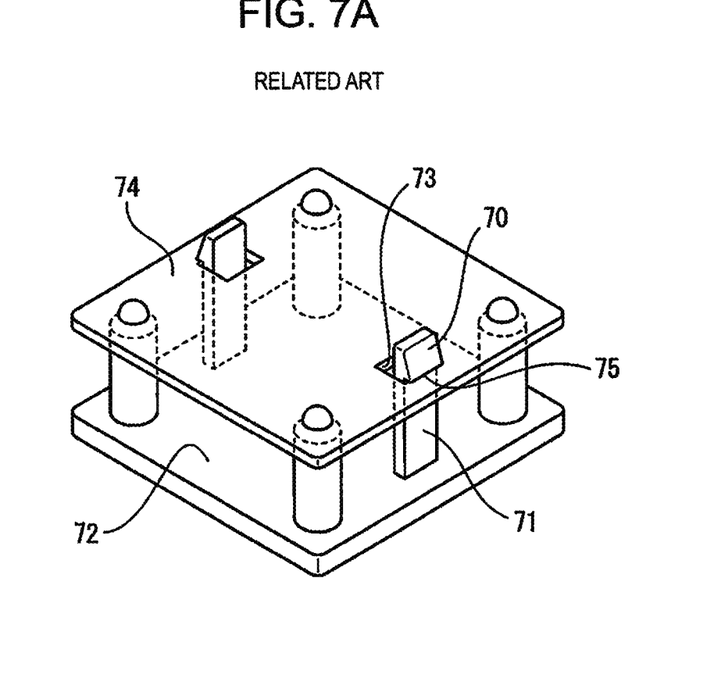
FIG. 7A is a perspective view illustrating a related snap fit.

A component assembly utilizing a snap fit makes it possible to fit components to each other with ease without tools, and has been therefore widely adopted. FIG. 7A illustrates a related snap fit. In the snap fit, a first component 72 having an elastic column 71 provided with an engaging piece 70, and a second component 74 having a cutout 73 with which the engaging piece 70 engages are included, and an edge 75 where the cutout 73 opposes the engaging piece 70 by the engaging piece 70 protruding laterally from the elastic column 71 is included. Documents below are each known, for example, as the component fitting technology as described above.

JP H9-280219 A discloses a one-touch joint in which a guide pin is inserted into a guide hole and expands a guide pin through-hole by overcoming a compression force of a ring spring that tightens a mating female member, and the mating female member is matedly locked with a locking step of the guide pin.

JP 2016-180489 A discloses a driving unit that includes a gear that is rotatably supported by a fixed shaft that is provided on a first base member protruding therefrom, and a second base member disposed opposing the first base member so as to cover the gear, in which the first base member is provided with a locking piece which locks the gear to prevent falling thereof and is locked to the second base member.

JP 2009-180323 A discloses a snap fit in which, in a snap fit in which snap pieces each having a leg portion and a locking head portion are disposed symmetrically with a deformation space interposed therebetween, a space expansion portion obtained by partially expanding the deformation space is provided on a tip part of the snap piece.

SUMMARY OF THE INVENTION

Figure 7B:
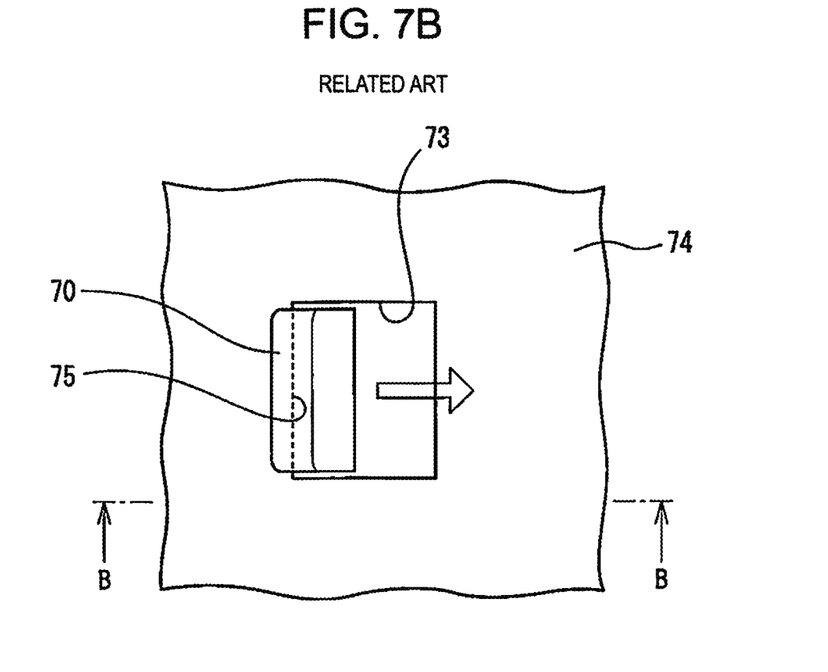
FIG. 7B is a plan view illustrating a state in which the related snap fit is disengaged.
Figure 7C:
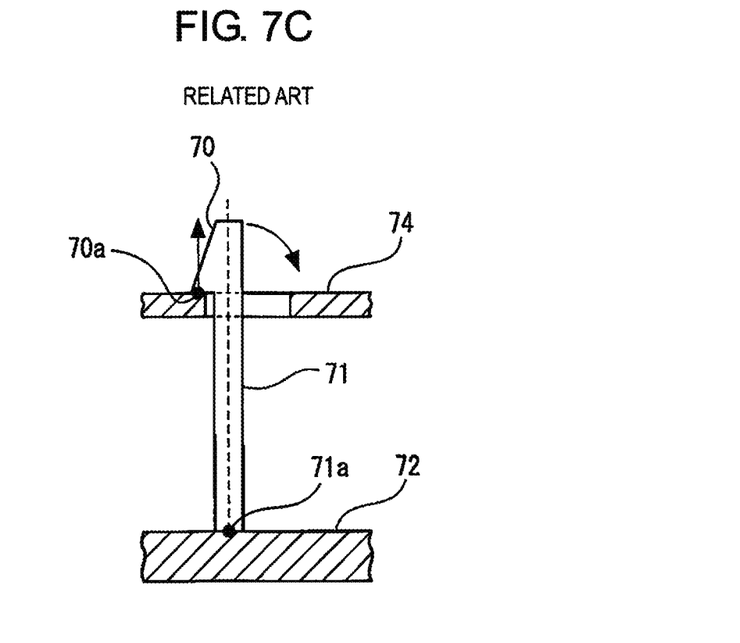
FIG. 7C is a cross-sectional view taken along a line B-B, illustrating the state in which the related snap fit is disengaged.

Component assembly that utilizes a snap fit has good assembly workability, but cannot fully fix a component unlike a component fitting by screwing or the like, and therefore, there is a risk that the snap fit may be disengaged when force is applied to the component. FIG. 7B and FIG. 7C each illustrate a state in which the related snap fit is disengaged. Since there are two positions where moments act on the snap fit, as illustrated in FIG. 7C, the positions being a root part 71a of the elastic column 71 and a hook part 70a of the engaging piece 70, when force acts in a direction in which the second component 74 is pulled out, the elastic column 71 tilts and the snap fit is disengaged. Such a problem easily occurs particularly in component assembly of a housing, a circuit board, a heat sink, or the like of a device in which vibration, shock, or the like is transmitted, for example, a numerical control device that controls a machine tool.

Although there are various fitting methods in addition to the snap fit, as shown in a table below, assembly workability and engagement strength between components (structural strength) are in a trade-off relationship, and a component fitting structure that achieves both the assembly workability and the engagement strength between components is therefore desired. The assembly workability is an important viewpoint, particularly in automatic assembly by a robot.

| | Fitting Method | | |
|---|---|---|---|
| Merit/Demerit | Snap Fit | Snap Fit (Fixed Engagement) | Screwing |
| Assembly Workability | Excellent | Good | Fair |
| Components Engagement Strength | Fair | Good | Excellent |
| Problems | The snap fit may automatically be released by external force A risk of breakage of an engaging section Rattling of components | An engaging section is often hard (=slightly difficult to assemble) A component cannot be detached later | The number of components is increased Need for a tool for assembly |

Accordingly, an object of the present invention is to provide a component fitting technology provided with at least a disengagement prevention function.

One aspect of the present disclosure is to provide a component fitting structure including: a first component including an elastic column provided with an engaging piece; and a second component including a cutout capable of being engaged by the engaging piece, in which the engaging piece includes a first protrusion protruding laterally from the elastic column and a second protrusion protruding in a direction opposite to a protrusion direction of the first protrusion, and the cutout includes a first edge configured to oppose the first protrusion and a second edge configured to oppose a part of the second protrusion and open a remainder of the second protrusion, after the first component and the second component are fitted.

DETAILED DESCRIPTION

Embodiments of the present disclosure will be described in detail below with reference to the accompanying drawings. In each of the drawings, identical or similar constituent elements are given identical or similar reference signs. Additionally, the embodiments described below are not intended to limit the technical scope of the invention or the meaning of terms set forth in the claims.

Figure 1:
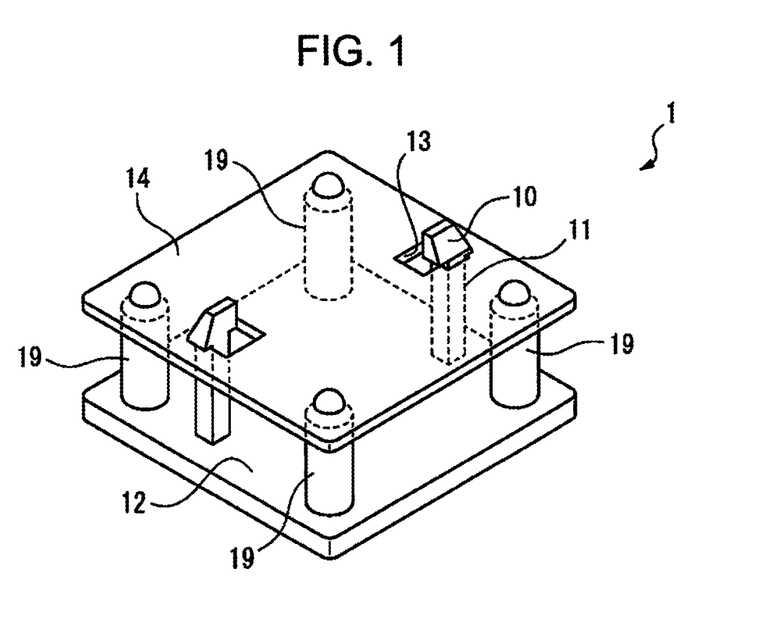
FIG. 1 is a perspective view illustrating a component fitting structure according to an embodiment.

FIG. 1 to FIG. 4 each illustrate a component fitting structure 1 according to the present embodiment. As illustrated in FIG. 1, the component fitting structure 1 includes a first component 12 including an elastic column 11 provided with an engaging piece 10, and a second component 14 including a cutout 13 with which the engaging piece 10 engages. A fitting position of the first component 12 or the second component 14 is positioned by a positioning member 19. The positioning member 19 is a positioning column that supports the second component 14, but a member with another form may be employed.

Figure 3:
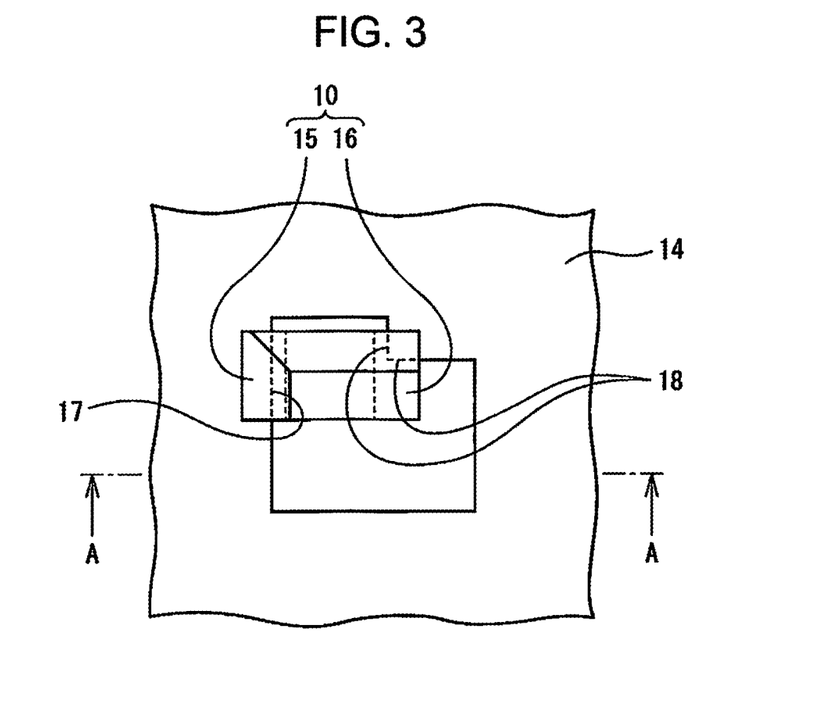
FIG. 3 is a plan view illustrating a component fitting structure according to an embodiment.
Figure 4:
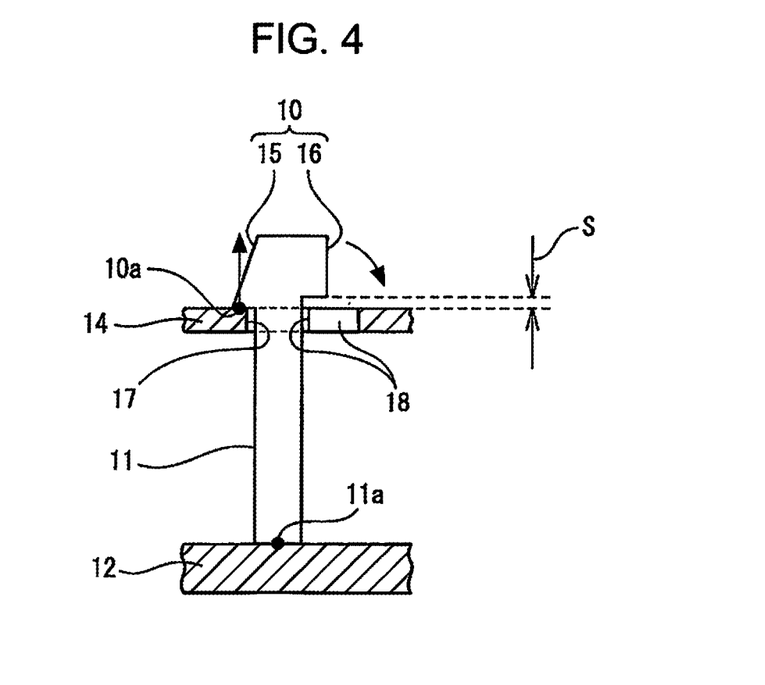
FIG. 4 is a cross-sectional view taken along a line A-A, illustrating a component fitting structure according to an embodiment.

As illustrated in FIG. 3 and FIG. 4, the engaging piece 10 includes a first protrusion 15 that protrudes laterally from the elastic column 11, and a second protrusion 16 that protrudes in a direction opposite to a protrusion direction of the first protrusion 15. The engaging piece 10 of the present example is provided at a tip of the elastic column 11, but may be provided at the middle portion of the elastic column 11, or a plurality of pieces may be provided at the tip, the middle portion, and the like of the elastic column 11. In the latter case, a plurality of components can be fitted in multiple stages.

Figure 2:
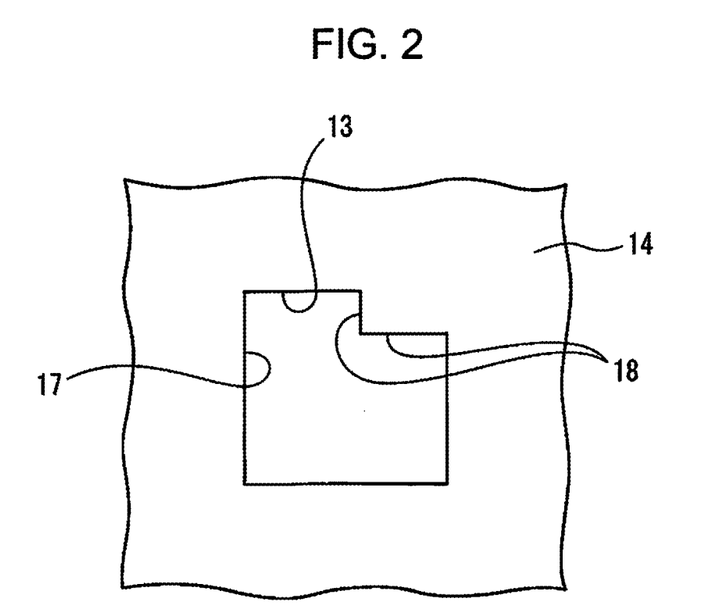
FIG. 2 is a plan view illustrating a cutout according to an embodiment.

As illustrated in FIG. 2 and FIG. 3, the cutout 13 is a deformed cutout, and includes a first edge 17 opposing the first protrusion 15 and a second edge 18 opposing a part of the second protrusion 16 and opening the remainder of the second protrusion 16 after the first component 12 and the second component 14 are assembled. The second edge 18 is L-shaped in a plan view, but may have a V shape, a semi-oval shape, or the like, as long as the shape opposes a part of the second protrusion 16 and opens the remainder of the second protrusion 16.

As illustrated in FIG. 4, although there are two positions where moments act, the positions being a root part 11a of the elastic column 11 and a hook part 10a of the engaging piece 10, even if force acts in a direction in which the second component 14 is pulled out and the elastic column 11 tilts, the elastic column 11 hits the second edge 18, so that the engagement does not automatically disengage. That is, since the second edge 18 plays the role of a stopper, the engagement strength is improved compared to the related snap fit. The component fitting structure according to the present example is particularly effective when applied to component assembly of a housing, a circuit board, a heat sink, or the like of a device in which vibration, shock, or the like is transmitted, for example, a numerical control device that controls a machine tool.

Furthermore, after assembly of the first component 12 and the second component 14, a gap S is desirably formed between the second protrusion 16 and the second edge 18. Although a portion where the engaging piece 10 is hooked is only the first edge 17 due to the gap S described above, since a moment caused by the second edge 18 does not act on the second protrusion 16, even if force acts in the direction in which the second component 14 is pulled out, the elastic column 11 does not tilt downward on a paper plane of FIG. 3. That is, the gap S plays the role to prevent secondary engagement release due to the second protrusion 16 being hooked on the second edge 18.

FIGS. 5A to 5D illustrate behavior of the component fitting structure at the time of component assembly. The engaging piece 10 may include a first sliding surface 20 sliding on the first edge 17 and a second sliding surface 21 sliding on the second edge 18 during assembly of the first component 12 and the second component 14. Both the first sliding surface 20 and the second sliding surface 21 are sloped surfaces that are sloped with respect to an extending direction of the elastic column 11. Since the second edge 18 of the present example has an L-shape having an opposite side 18a and an open side 18b, the second sliding surface 21 slides on the open side 18b, but in accordance with the second edge 18 having a V shape, a semi-oval shape, or the like, the second sliding surface 21 may slide not on the side but on a point.

Figure 5A:
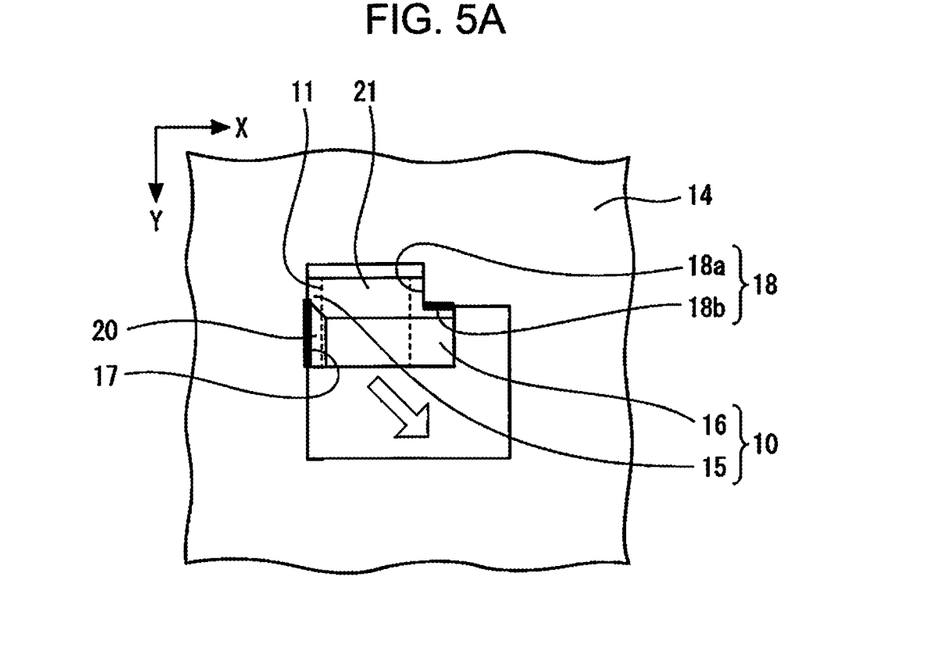
FIG. 5A is a plan view illustrating behavior of a component fitting structure at the time of component assembly.
Figure 5B:
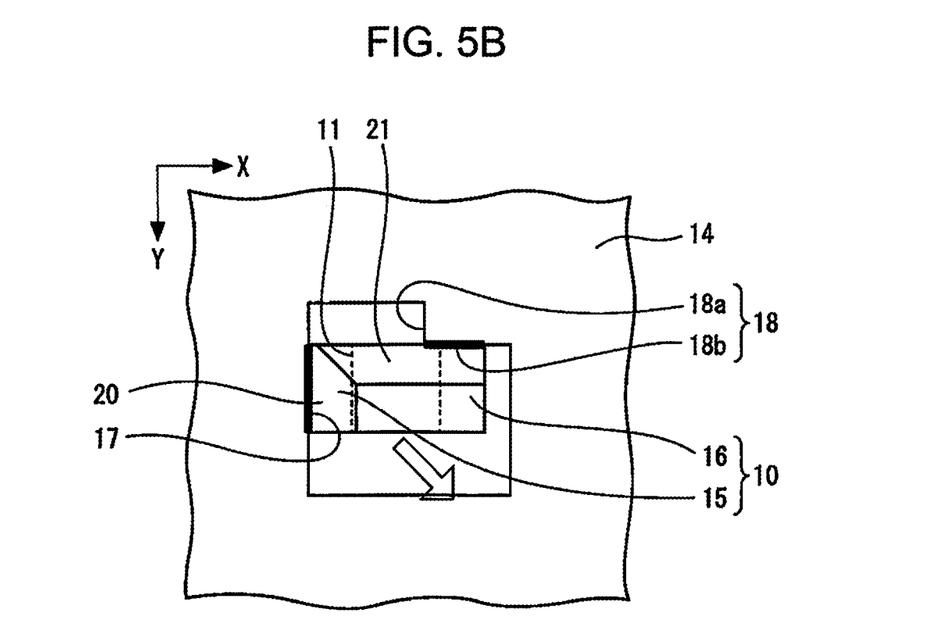
FIG. 5B is a plan view illustrating behavior of a component fitting structure at the time of component assembly.
Figure 5C:
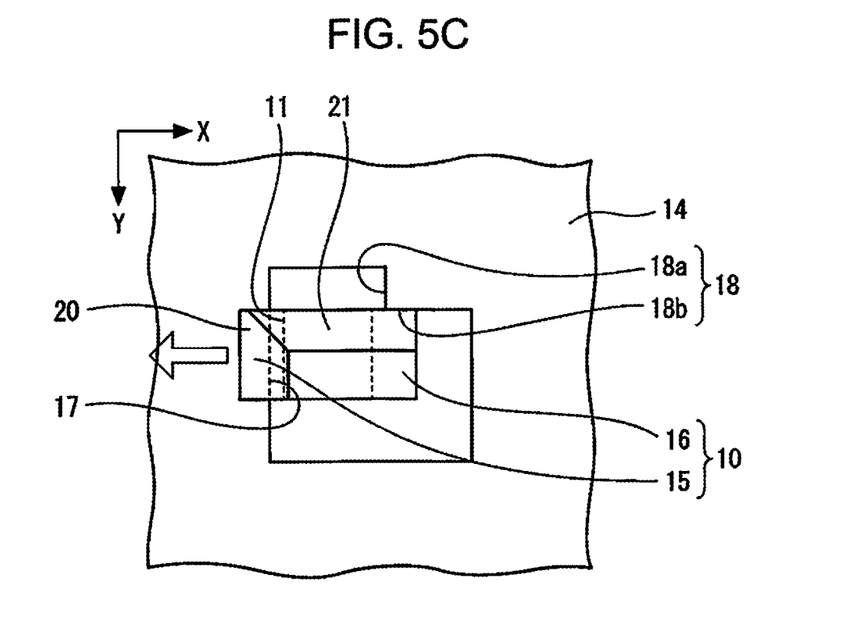
FIG. 5C is a plan view illustrating behavior of a component fitting structure at the time of component assembly.
Figure 5D:
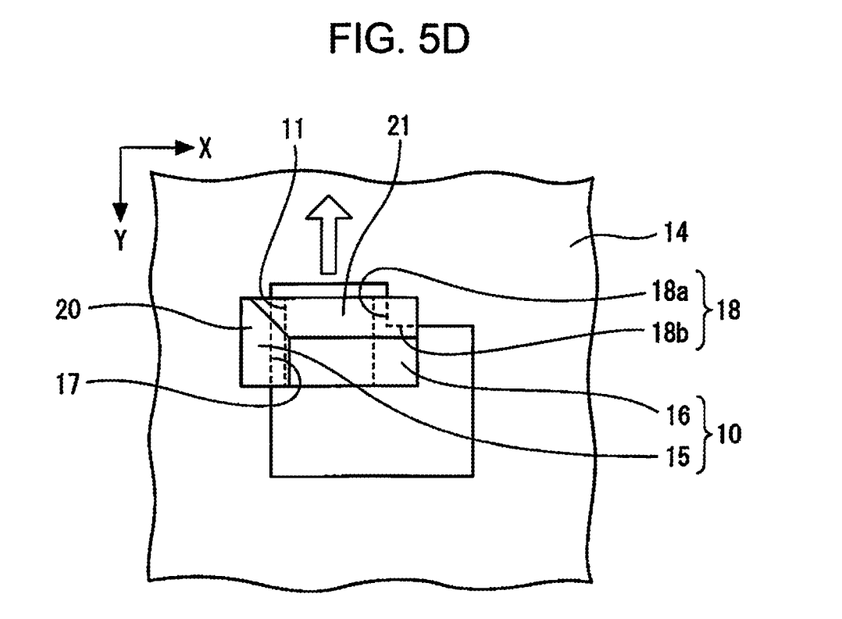
FIG. 5D is a plan view illustrating behavior of a component fitting structure at the time of component assembly.

As illustrated in FIGS. 5A and 5B, the first sliding surface 20 moves the engaging piece 10 to a side opposite to the protrusion direction of the first protrusion 15 (X direction), and the second sliding surface 21 moves the engaging piece 10 in a direction orthogonal to the protrusion direction of the first protrusion 15 (Y direction). As a result, the elastic column 11 is made into a state of being flexed and inclined in the arrow direction. Just before the first protrusion 15 is hooked on the first edge 17 as illustrated in FIG. 5B, since the second edge 18 (i.e., open side 18b) is in contact with the side surface of the elastic column 11, the inclination of the elastic column 11 in the X direction is first eliminated, and the first protrusion 15 is hooked on the first edge 17 as illustrated in FIG. 5C. Then, at the same time as or immediately after elimination of the inclination of the elastic column 11 in the X direction, the contact between the elastic column 11 and the second edge 18 is released, and the inclination of the elastic column 11 in the Y direction is eliminated. This causes the elastic column 11 to return to its original position. The original position of the elastic column 11 is positioned by the positioning member 19 described above.

In the above-described behavior of the component fitting structure at the time of component assembly, the operation is performed by one component being pushed into the other component using the tapered shape (i.e., first sliding surface 20 and second sliding surface 21) provided on the engaging piece 10. That is, when the components are pressed to each other, the snap fit automatically operates and an engaged state is obtained. Thus, according to the tapered shape as described above, the components can be assembled in the same manner as the related snap fit. Additionally, the component fitting structure of the present example can also be applied to an automatic assembly system provided with a robot that assembles the first component 12 and the second component 14.

Figure 6:
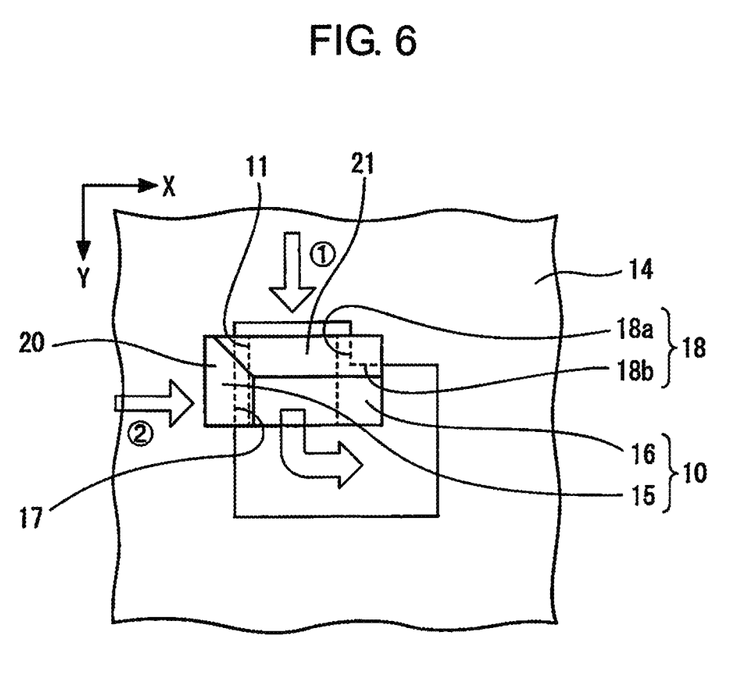
FIG. 6 is a plan view illustrating behavior of a component fitting structure at the time of component detachment.

FIG. 6 illustrates behavior of the component fitting structure at the time of component detachment. In the engaged state, since the elastic column 11 hits the second edge 18 (opposite side 18*a*), the elastic column 11 cannot be tilted in the X direction. Accordingly, first, (1) the elastic column 11 is tilted in the Y direction, and then (2) the elastic column 11 is tilted in the X direction in a state in which the elastic column 11 is tilted in the Y direction. As a result, the engagement of the component fitting structure is released, and the first component 12 and the second component 14 can be detached. Accordingly, an artificial or mechanical task is always necessary for the engagement release, and the engagement does not automatically disengage due to disturbance such as vibration, shock, or the like.

According to the present embodiment, even if force acts in a direction in which the component is disengaged and the elastic column 11 tilts, the elastic column 11 hits the second edge 18, so that the engagement does not automatically disengage. In other words, since the second edge 18 plays the role of a stopper, the engagement strength between the components is improved.

Although some embodiments have been described in this specification, the present invention is not limited to the above-described embodiment, and it is to be understood that various changes can be made without departing from the scope of the appended claims.

The invention claimed is:

1. A component fitting structure, comprising:
   a first component including an elastic column provided with an engaging piece; and
   a second component including a cutout configured to be engaged by the engaging piece,
   wherein the engaging piece includes a first protrusion protruding laterally from the elastic column and a second protrusion protruding in a direction opposite to a protrusion direction of the first protrusion,
   wherein the cutout includes a first edge configured to oppose the first protrusion and a second edge configured to oppose a part of the second protrusion and open a remainder of the second protrusion, after the first component and the second component are assembled, and
   wherein a gap is formed between the second protrusion and the second edge after assembly of the first component and the second component with the engaging piece engaged in the cutout, and the gap is larger than a gap that may be formed between the first protrusion and the first edge.

2. The component fitting structure of claim 1,
   wherein the engaging piece includes a first sliding surface configured to slide on the first edge during assembly of the first component and the second component, and the first sliding surface moves the engaging piece in the direction opposite to the protrusion direction of the first protrusion.

3. The component fitting structure of claim 1,
   wherein the engaging piece includes a second sliding surface configured to slide on the second edge during assembly of the first component and the second component, and the second sliding surface moves the engaging piece in a direction orthogonal to a protrusion direction of the second protrusion.

4. The component fitting structure of claim 1,
   wherein a plurality of the engaging piece is pieces are respectively provided at a tip and a middle portion of the elastic column.

5. The component fitting structure of claim 1,
   wherein the second edge is L-shaped, V-shaped, or semi-oval shaped.

6. The component fitting structure of claim 1, further comprising:
   a positioning member configured to position an assembly position of the first component and the second component.

7. An automatic assembly system comprising:
   a robot including a component fitting structure, the component fitting structure comprising:
      a first component including an elastic column provided with an engaging piece; and
      a second component including a cutout configured to be engaged by the engaging piece,
   wherein the robot is configured to assemble the first component and the second component
   wherein the engaging piece includes a first protrusion protruding laterally from the elastic column, and a second protrusion protruding in a direction opposite to a protrusion direction of the first protrusion,
   wherein the cutout includes a first edge configured to oppose the first protrusion, and a second edge configured to oppose a part of the second protrusion and open a remainder of the second protrusion, after the first component and the second component are assembled, and
   wherein a gap is formed between the second protrusion and the second edge after assembly of the first component and the second component with the engaging piece engaged in the cutout, and the gap is larger than a gap that may be formed between the first protrusion and the first edge.

* * * * *